Feb. 8, 1927.
G. GLAUDEL
GLASS GRINDING MACHINE
Filed Feb. 4, 1924    5 Sheets-Sheet 1
1,617,106
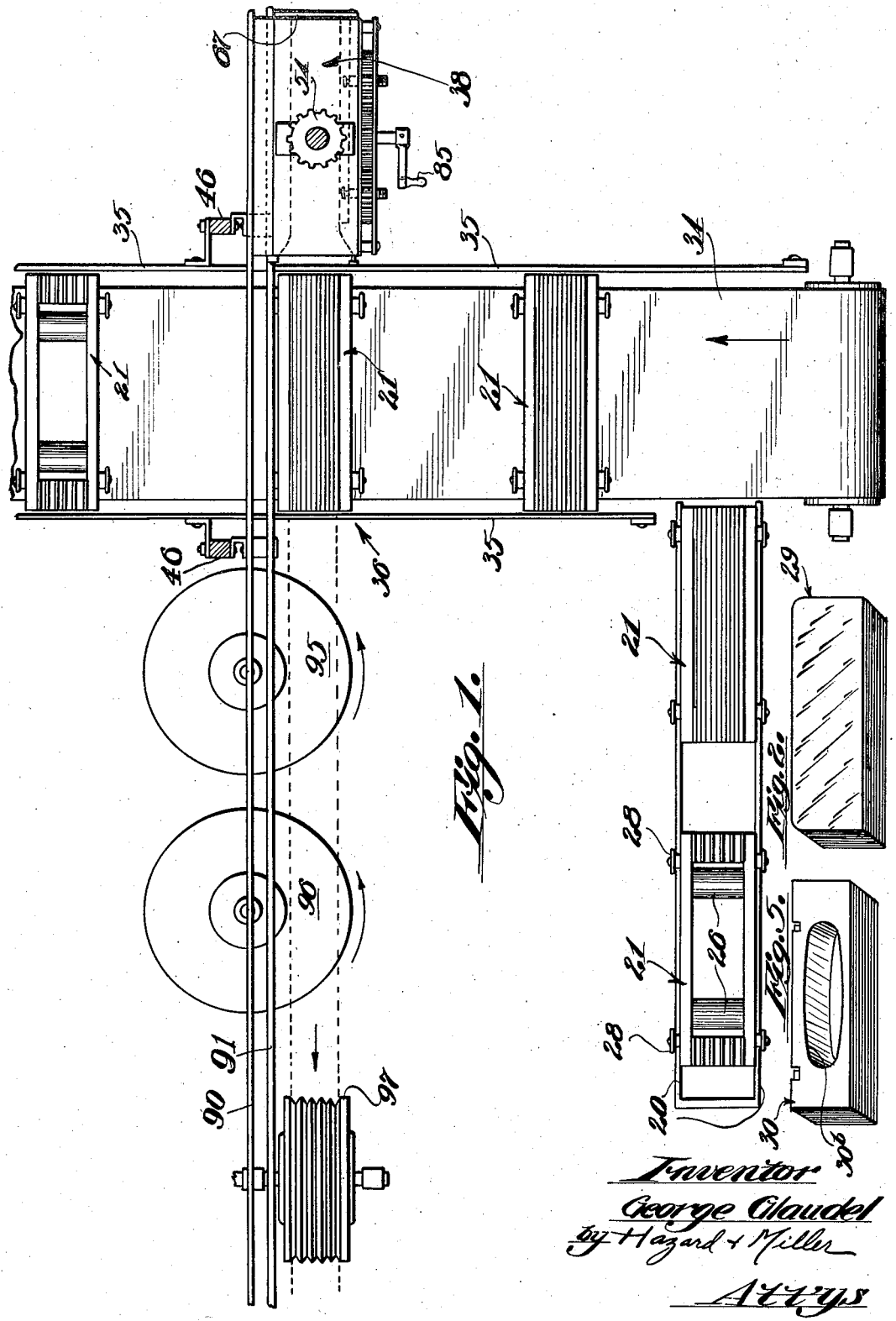

Feb. 8, 1927.
G. GLAUDEL
1,617,106
GLASS GRINDING MACHINE
Filed Feb. 4, 1924      5 Sheets-Sheet 2
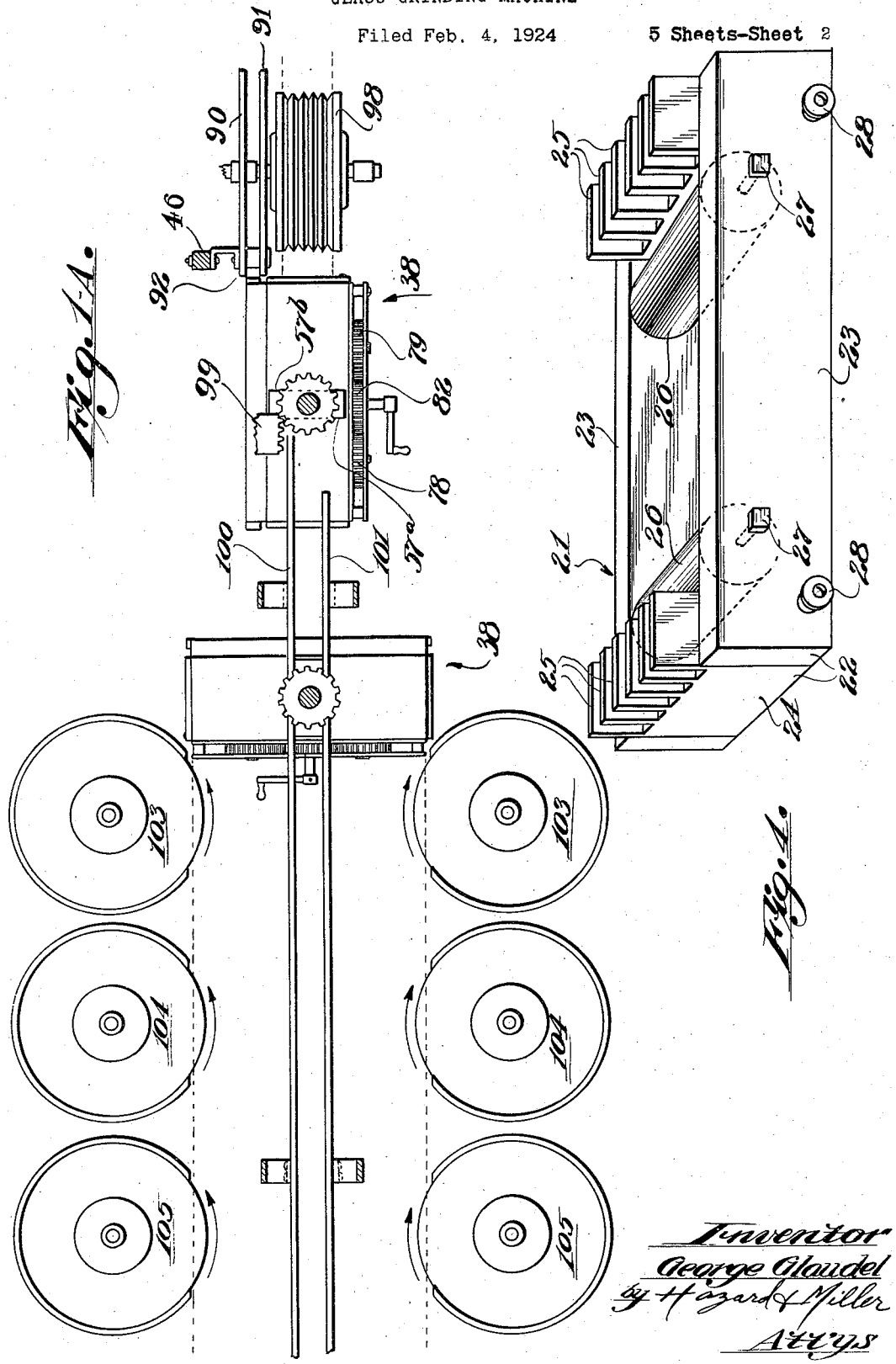

Feb. 8, 1927. 1,617,106
G. GLAUDEL
GLASS GRINDING MACHINE
Filed Feb. 4, 1924   5 Sheets-Sheet 3

Inventor
George Glaudel
by Hazard + Miller
Att'ys

Feb. 8, 1927. 1,617,106
G. GLAUDEL
GLASS GRINDING MACHINE
Filed Feb. 4, 1924 5 Sheets-Sheet 4
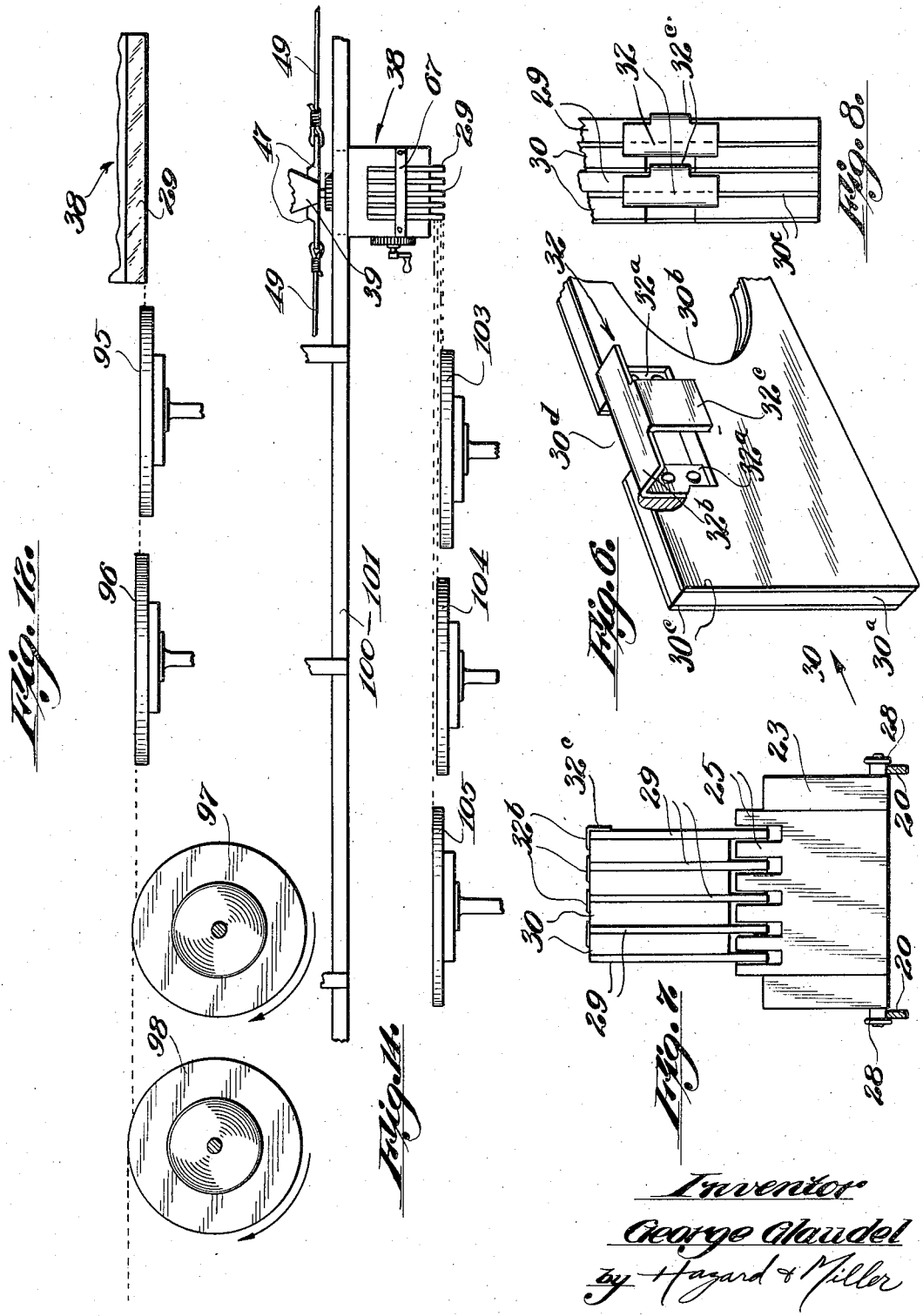

Feb. 8, 1927. 1,617,106
G. GLAUDEL
GLASS GRINDING MACHINE
Filed Feb. 4, 1924 5 Sheets-Sheet 5
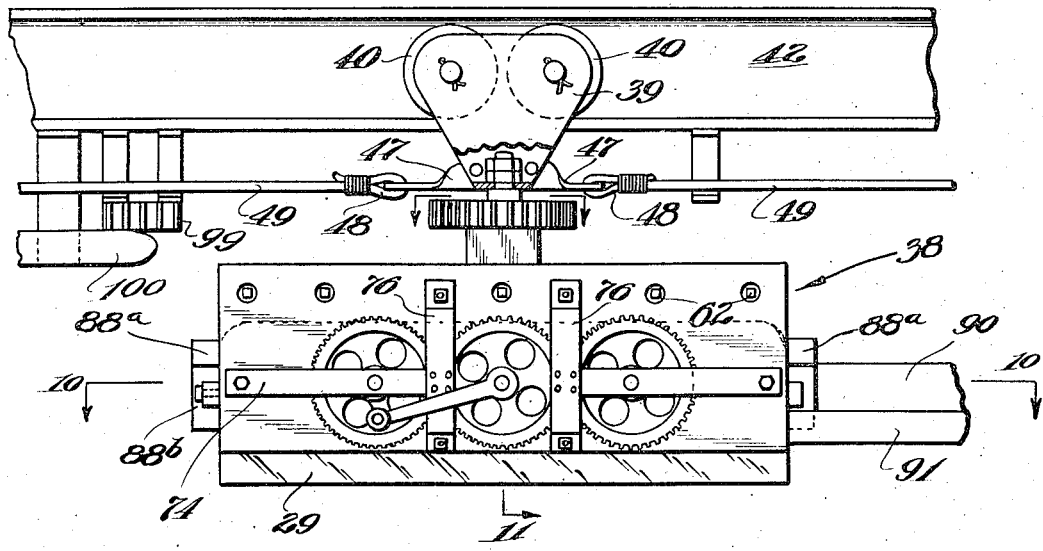
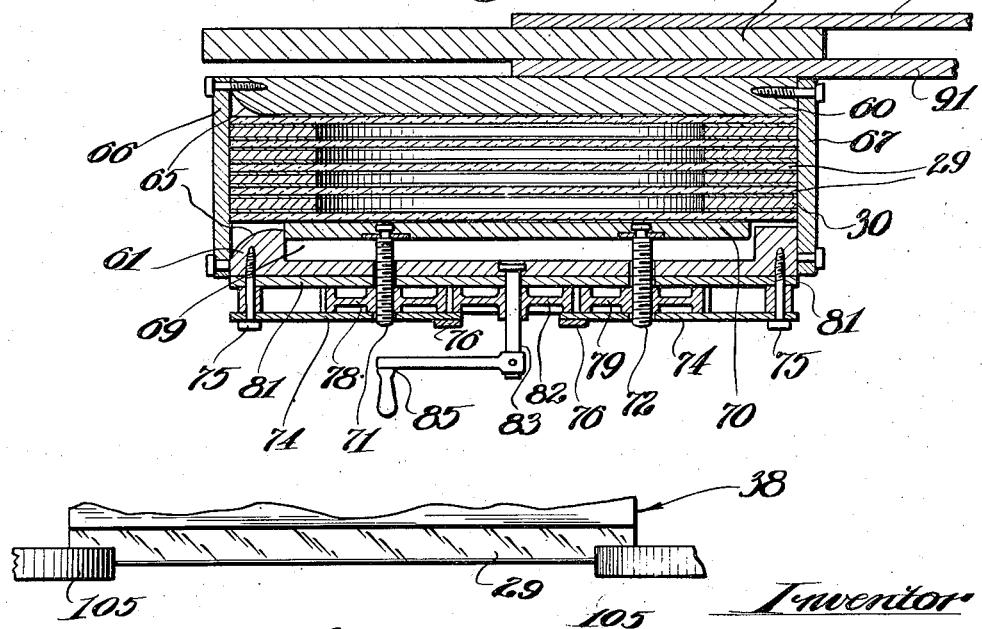

Patented Feb. 8, 1927.

1,617,106

UNITED STATES PATENT OFFICE.

GEORGE GLAUDEL, OF LOS ANGELES, CALIFORNIA, ASSIGNOR OF FIFTEEN PER CENT TO HERMAN MILLER, OF SOUTH PASADENA, CALIFORNIA.

GLASS-GRINDING MACHINE.

Application filed February 4, 1924. Serial No. 690,623.

This invention relates to means and methods for grinding glass plates and is particularly adapted for grinding glass plates for automobile wind shields.

An object of this invention is the provision of means for grinding glass plates in quantity.

Another object of this invention is the provision of means for successively truing, beveling and notching glass plates in quantity.

A further object of my invention is the provision of means for spacing glass plates which are to be worked upon in quantities.

A still further object of my invention is the provision of special means for holding a plurality of glass plates held in spaced relation.

Another object of my invention is the provision of means for gripping and carrying a plurality of glass plates over a series of grinding wheels.

With the foregoing objects in view, together with such other objects and advantages as may hereinafter appear, my invention resides in the construction and arrangement of parts hereinafter described and claimed and illustrated in the accompanying drawings, in which:

Figure 1 is a plan view of a part of my apparatus and

Fig. 1A is a plan view of a part of my apparatus which joins with the apparatus shown in Figure 1 with the upper track removed, the supports being shown in section.

Fig. 2 shows a perspective view of a stack of flat glass plates rounded at their upper corners.

Fig. 4 is a perspective view of means for holding a plurality of glass plates.

Fig. 5 is a perspective view of a stack of spacing boards employed to hold glass plates in spaced relation.

Fig. 6 is a perspective view on an enlarged scale showing in detail a portion of a spacing board.

Fig. 7 is an end view of the plate holding means shown in Fig. 4 and containing glass plates separated by spacing boards.

Fig. 8 is a plan view of a portion of the glass plates and spacing boards shown in Fig. 7.

Fig. 9 is an elevational view of means for gripping the glass plates and removing them together with the spacing boards from the holding means shown in Figs. 4 and 7, and means for moving the gripping means.

Fig. 10 is a horizontal section taken on line 10—10 of Fig. 9.

Fig. 12 is a side view of grinding and beveling wheels adapted to come in contact with traveling glass plates.

Fig. 14 is an end view showing the traveling gripping means containing glass plates and separators in relation to grinding wheels for cutting notches in the glass plates, and Fig. 15 is a view showing grinding wheels in position for cutting notches in lower end portions of a glass plate.

Figures 3, 11, 13:
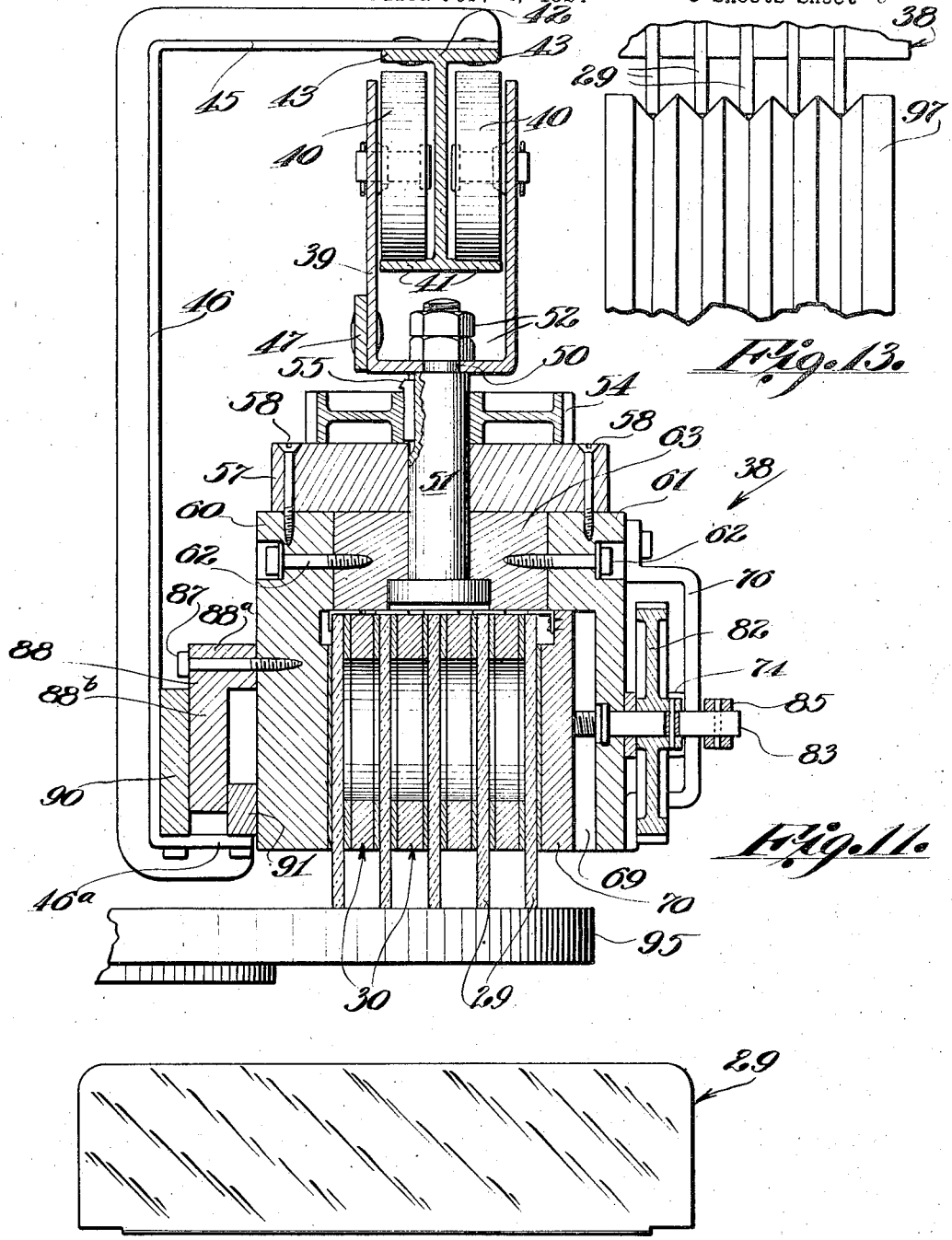
Fig. 3 is an elevational view of a glass plate after having passed through the grinding apparatus shown in Figures 1 and 1A, in which the lower edge has been surfaced and beveled and notches cut in its lower end portions.
Fig. 11 is a vertical section taken on line 11—11 of Fig. 9.
Fig. 13 is a view showing lower edges of glass plates in relation to beveling wheels.

Referring to the drawings for a more detailed description thereof, the numeral 20 indicates tracks on which travel holding means 21 for glass plates shown in Fig. 4, the holding means 21 comprising a rectangular frame 22 having side members 23 and end members 24, from which end members project vertically a series of spaced fingers 25 adapted to separate a plurality of glass plates such as shown in Fig. 2.

Between the side members 23 extend two spaced parallel rollers 26 rotatable on axes 27 which are supported in the side members 23.

The rollers 26 are positioned so that the tops of their peripheries extend above the upper edges of the end members 24 of the frame 22. The sides 23 of the frame 22 are provided with wheels or rollers 28 adapted to run on the track 22.

A plurality of glass plates such as shown in Fig. 2 are placed in the holding means 21 each plate being held at both ends between two of the fingers 25 and are positioned so that the rounded corners of the glass plates are uppermost and the lower edges of the glass plates shown in Fig. 2, rest on the rollers 26.

Above the fingers 25 and between the glass plates 29, shown in Fig. 7, are positioned spacing boards 30. The construction of the spacing board 30 is shown in detail in Fig. 6 and comprises a rectangular board 30$^a$ provided with an aperture 30$^b$ extending between its faces, which are each covered with a layer of rubber 30$^c$. The spacing board 30$^a$ together with the layers of rubber 30$^c$ are provided on their upper edges with notches 30$^d$.

Extending from one face of the spacing board 30 is a member 32 secured thereto by means of elements 32$^a$ which are countersunk in the board or body portion 30$^a$. A part 32$^b$ extends from the top edge of the board at right angles to the faces and has a tongue or lug 32$^c$ opposite the notch or recess 30$^d$ and extending parallel with the face of the board.

A separator 30 is placed between each of the plates 29, as shown in Fig. 7, the lug or tongue 32$^c$ attached to each board projecting into the recess 30$^d$ of an adjacent board, and the portion 32$^b$ resting on the upper edge of a plate.

The structure of the spacing board 30 comprising the aperture 30$^b$ and the rubber coverings 30$^c$ is a feature of my invention, providing as they do, a means for creating a partial vacuum and thus serving to aid in holding the plates to the spacing boards.

When holding means 21 has been filled with glass plates 29 and spacing boards 30, it is run over the track 20 towards and onto an endless belt conveyor 34 which runs at right angles to the track 20. The conveyor 34 transports the holding means 21 between guide rails 35 to a position 36 at which point it is stopped.

Means are provided for gripping the plates and their separators while they are in the holding means 21 and for removing them from the holding means. The gripping means comprises an adjustable clamp 38 suspended from a yoke 39, shown in Fig. 11, and which carries wheels 40 which travel on the bottom flanges 41 of an I beam 42, the upper flanges 43 of which are secured to a horizontal part 45 of a supporting member 46.

Projecting from the yoke 39 are extensions 47 having apertures adapted to engage closed loops 48 in portions of a rope 49 which is power driven for the purpose of propelling the clamping means along the flanges 41 of the I beam 42.

In the bottom of the yoke 39 is formed an aperture 50 thru which passes the upper portion of a rod 51, the rod being held to the yoke 39 by means of nuts 52 engaging a threaded portion of the rod 51 and supported by the bottom of the yoke 39.

Below the bottom of yoke 39 a gear wheel 54 is mounted on the rod 51 against rotation by means of a key 55, and rests on a block 57 encircling the rod 51 which is secured by means of screws 58 to a back jaw 60 and a front frame member 61, the members 60 and 61 being attached by means of screws 62 to a block 63 in which the lower end of the rod 51 is held in any suitable manner.

Corresponding ends of the jaw 60 and the front frame member 61 are preferably rounded, as shown at 65 in Fig. 10. The members 60 and 61 are held together at their ends by transverse pieces 66 and 67.

The member 61 is provided with a recess 69 adapted to receive an adjustable jaw 70. The jaw 70 holds at their ends against rotation threaded members 71 and 72 which pass outwardly thru the member 61 and are supported at their outer ends by horizontal bars 74 which are secured at their outer ends to the member 61 by screws 75 and at their inner ends to vertical brackets 76 which are fastened at their ends to the frame member 61.

Gear wheels 78 and 79, the hubs of which are provided with inner threads, are mounted respectively on the threaded members 71 and 72 and held in position between the horizontal bars 74 and a plate 81 which is secured to the outer face of the frame member 61 by screws 75. Interposed between the gears 78 and 79 is an intermediate gear 82 engaging gears 78 and 79 and also held between the bars 74 and the plate 81.

The intermediate gear 82 is fixedly mounted on a shaft 83 the inner end of which is rotatably secured to the frame member 61. A lever 85 is attached to the outer end of the shaft 83 and when turned causes a movement of the adjustable jaw 70 thru movement of the gears 78, 79, and 82, the first two of which move the threaded members 71 and 72.

To the frame member or jaw 60 is affixed, by means of a screw 87, a right-angular shaped member 88 having a horizontal section 88$^a$ projecting from the member 60 and a vertical downwardly extending section 88$^b$ parallel to the face of the member 60 and spaced from it.

The member 88 is held between guides 90 and 91 which are supported on a horizontal turned-in section 46$^a$ of the member 46. The guide rails 90 and 91 extend from the extreme left of Fig. 1 to a point 92 in Fig. 1$^A$ and thus keep the traveling clamp or gripping means in a predetermined path as far as they extend.

With the holding means 21, containing the glass plate 29 and the spacing boards 30, standing in position, 36, the traveling gripping means 38 is moved from the position shown in Fig. 1 to the left, until the right ends of the plates and spacing boards abut against the end frame members 66 and 67 of the clamp 38, the spaced plates 29 passing, relatively between the frame members 60 and 61. The lever 85 is then turned until the plates are securely clamped between the jaws 60 and 70. It will be seen in Fig. 11 that the lower end portions of the plates 29 extend below the bottom of the clamp 38, the purpose of which will subsequently be apparent.

After the clamp 38 has been tightened on the plates 29, it is moved to the left from its position over the conveyor 34 and in its movement carries the plates and their spacing boards from the holding means 21, which operation is facilitated by the fact that the plates rest on the rollers 26. During movement of the traveling clamp 38 the bottom edges of the plates 29 are made to come into contact with the periphery and face of a rotating grinding wheel 95 which turns in counter-clockwise direction and functions to surface the lower edges of the plates 29. During continued movement of the plates, they are brought into contact with a rotating grinding wheel 96, which, as shown in Fig. 12, is positioned higher than the wheel 95, by which a further cut is taken from the lower edges of the plates.

The traveling clamp or gripping means 38, subsequent to the grinding of the lower edges of the plates brings the lower edges of the latter into contact with means for beveling the edges and such means is here illustrated as comprising a rotating grinding wheel 97, which turns, as shown in Fig. 12, in a clockwise direction and against the oncoming plates. As shown in Figs. 1 and 13, the beveling wheel 97 is formed with ridges on the periphery and is so positioned that the lower edges of the plates will be beveled by the wheel between the ridges, as shown in Fig. 13. After passing the wheel 97, the plates are brought into contact with another beveling wheel, labeled 98 in Fig. 1$^A$ and is of the same construction as the wheel 97. The wheel 98, however, is set a trifle higher than the wheel 97 to take a further cut on the bevels.

The traveling clamp 38 being continued in motion, it leaves the guides 90 and 91, and the gear 54 comes into contact with a rack 99 which turns the clamp 38 until the side 57$^a$ of the block 57 comes into contact with a face of a guide rail 100, the clamp being thereby turned thru 90°. A side 57$^b$, opposite the side 57$^a$ of the block 57 will then contact with a guide rail 101.

The clamp then continues its travel towards the left of Fig. 1$^A$ and thereby brings the lower outer end portions of the plates 29 into contact with a pair of opposite rotating grinding wheels 103 which cut notches in the plates, as shown in Fig. 15. After passing the notching wheels 103, the plates are brought into contact with another pair of notching wheels 104, which are set higher and closer in and are thus adapted to advance the cutting of the notches. Similarly another pair of notching wheels 105 are set higher and closer together than the preceding pairs 103 and 104 and further advance the cutting of the notches. It will be understood that any desired number of notching wheels may be employed, depending on the dimensions of the notch to be cut.

While I have herein described one form of my invention, modications thereof may be devised without departing from the spirit thereof, and it is to be understood that such modifications come within the scope of this invention.

I claim as my invention:

1. Spacing means for glass plates comprising a body, a covering of rubber on the faces thereof, having a transverse aperture extending thru said body and said rubber covering, and means for holding a glass plate to one of said rubber coverings.

2. Spacing means for glass plates comprising a body, rubber covering on the faces of said body, and having an aperture thru said body and said rubber covering, means including a lug extending from the spacing means for holding a glass plate to one of said rubber coverings, said spacing means having a notch opposing said lug.

3. A plurality of means for spacing glass plates, said spacing means comprising a body, rubber covering on the faces of said body, and having an aperture transversely thru said body and said rubber covering, means extending from the spacing means for holding a glass plate to one of said rubber coverings, said spacing means having a notch for the reception of a lug of the adjacent spacing means.

4. Means for holding glass plates in spaced relation comprising a frame, spaced fingers projecting vertically from the ends of said frame, and a plurality of parallel rollers extending between the sides of said frame for supporting glass plates.

5. Means for holding glass plates in spaced relation comprising a frame, spaced fingers projecting vertically from the ends of said frame, a plurality of parallel rollers extending between the sides of said frame for supporting glass plates, and means for transporting said holding means.

6. In glass grinding apparatus, means for maintaining a plurality of glass plates in spaced relation, a conveyor for transporting said holding means containing said plates, means for gripping said plates, said plates each having one edge extending beyond said gripping means, means for moving said gripping means, a plurality of rotatable grinding wheels adapted to contact successively with one edge of said plates for surfacing said one edge, means for beveling said one edge, and means for cutting notches in said plates at the end portions thereof.

7. In glass grinding apparatus, means for maintaining a plurality of glass plates in spaced relation, a conveyor for transporting said holding means containing said plates, means for gripping said plates, said plates each having an edge extending beyond said gripping means, means for moving said gripping means, a plurality of rotatable grinding wheels adapted to contact successively with one edge of said plates during motion of said plates for surfacing said one edge, means for beveling said one edge, and means for cutting notches in said plates at the end portions thereof, the last named means comprising a plurality of rotatable grinding wheels arranged on either side of the ends of said plates, the wheels on each side each being positioned to successively advance the cutting of the notch.

8. In glass grinding apparatus, means for maintaining a plurality of glass plates in spaced relation, said holding means comprising wheels for transporting the same to a conveyor, a conveyor for transporting said holding means containing said plates, guides for keeping said holding means in position on said conveyor, means longitudinally of said plates for gripping the same, said plates having their lower edge extending below said gripping means, said gripping means comprising a frame, an adjustable jaw, threaded members held at their ends to said jaw, gears held by said frame threadedly turning on said threaded members, a gear intermediate of said gears engaging the latter, and means for turning said intermediate gear to adjust said jaw, means for suspending said gripping means, means for guiding said gripping means, means for conveying said gripping means, a plurality of rotatable grinding wheels adapted to contact successively with one edge of said plates during motion of the latter for surfacing an edge thereof, rotating means for beveling one edge of said plates, means for turning said plates thru 90°, and means for cutting notches in said plates at the end portions thereof, the last named means comprising a plurality of rotatable grinding wheels arranged on either side of the ends of said plates, the wheels on each side being positioned to successively advance the cutting of the notches.

9. In glass grinding apparatus, means for gripping a plurality of glass plates held in spaced relation, said plates having their lower edge extending beyond said gripping means, means for moving said gripping means, a plurality of rotatable grinding wheels adapted to contact successively with one edge of said plates during motion of said plates for surfacing said edge, means for beveling said edge and means for cutting notches in said plates.

10. In glass grinding apparatus, means for gripping a plurality of glass plates held in spaced relation, said gripping means comprising a frame, an adjustable jaw, threaded members held by said jaw gears, gears having threaded hubs engaging and turning on said threaded members, a gear intermediate of said gears engaging the latter, means for turning said intermediate gear to adjust said jaw, means for suspending said gripping means, means for guiding said gripping means and means for conveying said gripping means.

11. In glass grinding apparatus, means for gripping a plurality of glass plates held in spaced relation, said gripping means comprising a frame, an adjustable jaw, threaded members held by said jaw gears, gears having threaded hubs turning on said threaded members, a gear intermediate of said gears engaging the latter, means for turning said intermediate gear to adjust said jaw, means for suspending said gripping means, means for guiding said gripping means, means for conveying said gripping means, and means for turning said gripping means through ninety degrees at a predetermined position in its path of motion and means for cutting notches in said plates.

In testimony whereof I have signed my name to this specification.

GEORGE GLAUDEL.